United States Patent
Sakamoto et al.

[11] Patent Number: 5,878,132
[45] Date of Patent: Mar. 2, 1999

[54] HIGH-FREQUENCY NOISE ELIMINATION FOR USE IN TELEPHONE SYSTEMS

[75] Inventors: Yukio Sakamoto, Moriyama; Yoshihiro Kurokawa, Yokohama; Hidetoshi Yamamoto, Fukui-ken, all of Japan

[73] Assignee: Murata Manufacturing Co., Ltd., Nagaokakyo, Japan

[21] Appl. No.: 663,813

[22] Filed: Jun. 14, 1996

[30] Foreign Application Priority Data

Jun. 15, 1995 [JP] Japan ................................. 7-149192

[51] Int. Cl.⁶ ............................................. H04M 1/58
[52] U.S. Cl. ........................ 379/391; 379/387; 379/420
[58] Field of Search ................................. 379/415, 416, 379/387, 417, 391, 392, 420; 455/70, 90, 439, 462, 465, 552; 336/69, 196, 198; 333/167, 185

[56] References Cited

U.S. PATENT DOCUMENTS

| | | | |
|---|---|---|---|
| 3,387,096 | 6/1968 | Grandstaff et al. | 379/391 |
| 3,839,686 | 10/1974 | Vogl | 333/12 |
| 3,982,814 | 9/1976 | Kaiserwerth et al. | 323/78 |
| 4,394,631 | 7/1983 | Pavlic | 333/132 |
| 4,779,068 | 10/1988 | Sakamoto et al. | 333/176 |
| 4,845,393 | 7/1989 | Burgess et al. | 310/51 |
| 4,945,332 | 7/1990 | Sakamoto et al. | 336/69 |
| 5,069,641 | 12/1991 | Sakamoto et al. | 439/620 |
| 5,495,213 | 2/1996 | Ikeda | 333/181 |

OTHER PUBLICATIONS

H. Meinke and F.W. Gundlach, "Taschenbuch der Hoch–frequenztechnik," edition, Berlin, Göttingen, Heidelberg: Springer Verlag (publishing house), 1962, pp. 27 to 29.

*Primary Examiner*—Scott Wolinsky
*Attorney, Agent, or Firm*—Burns, Doane, Swecker & Mathis, LLP

[57] ABSTRACT

A noise elimination scheme is disclosed which enables the prior established telephones or telephone exchange modules linked thereto to eliminate high-frequency noises as applied from outside portable radiotelephone transceiver units. A choke coil (15) is arranged on a circuit board (2) of a telephone main body (1) at a respective one of several nodes for connection with external communication lines (5). Another choke coil (15) is provided at each interconnection node between the circuit board (2) and signal transmission lines (6) of a telephone handset (10). Respective choke coils (15) have a specific stray capacitance of 0.3 pF or below to insure successful elimination of high frequency noises of at or above 800 MHz.

8 Claims, 3 Drawing Sheets

HIGH-FREQUENCY NOISE ELIMINATION FOR USE IN TELEPHONE SYSTEMS

BACKGROUND OF THE INVENTION

1. Field of the Invention

The present invention relates generally to noise elimination schemes, and more particularly, to noise elimination devices for avoiding interference of high frequency noises within telephones or associative exchange modules.

2. Description of the Prior Art

In recent years, wireless radiotelephone communication systems have been developed which include a city-wide telepoint system employing mobile telephone handset units, e.g., portable or handheld radiotelephone transceivers that can access the public switched telephone network via any accessible base unit within a defined geographical coverage area. As such mobile radiotelephone transceivers are becoming more widely used with the coexisting telephone network, the prior established stationary telephones and associated switch or exchange modules therein encounter more frequently a problem in that noises are induced by such transceivers to adversely affect communications in the stationary telephones. Because the transceivers are designed to operate at specific frequencies high enough to go beyond 800 MHz (typically, in a range of 1 to 2.5 GHz), high frequency components may possibly induce noises, which will enter or "invade" the prior established telephones and/or associated exchange modules by way of communication lines. While the telephones and exchange modules come with one or more general purpose or common mode choke coils for protection against unwanted mixture of high frequency noises, the choke coils are designed with no consideration aimed at protection from such high frequency noises as induced by outside radiotelephone transceivers.

The presently available choke coils generally employ either windings increased in the number of turns or windings wrapped around a core to form a multi-layered configuration. This means that the resulting stray capacitance between adjacent ones of turns of winding portions remains relatively large; for example, as large as 5 picofarads (pF). This results in the impedance decreased below 50 ohms ($\Omega$) at a frequency of 1 gigahertz (GHz) making it impossible to remove or eliminate such high frequency noises.

SUMMARY OF THE INVENTION

It is therefore an object of the present invention to provide an improved noise elimination scheme.

It is another object of the invention to provide an improved noise elimination device capable of successfully eliminating high frequency noises of 1 GHz or above in prior established telephone systems including individual telephones and associated exchange modules linked thereto.

The foregoing objects may be attained by providing a noise elimination device which includes one or more high-frequency noise elimination coils each having a stray capacitance of equal to or less than 0.3 pF as provided at one or more specifically selected positions including connection nodes between a telephone main body and an external communication link coupled thereto, nodes between an associative switch or exchange module and the external communication link, nodes between the telephone main body and the exchange module, and nodes between the main body and its associated telephone handset.

In accordance with the invention, the coil of such decreased stray capacitance may be accomplished i) by use of a single-layered wire structure for the winding, ii) by wrapping a wire around a core or bobbin at intervals defining a gap between adjacent turns of the winding, iii) by use of the core or bobbin comprised of a chosen low dielectric-constant material which preferably has the dielectric constant K is ten (10) or less such as epoxy-based resin, ferrite, alumina, dielectric ceramics, or the like, and/or iv) by excluding the use of any external resin sheath material.

With such an arrangement, selecting the value of stray capacitance to be 0.3 pF or below may enable achievement of an increased impedance of 500 $\Omega$ or above with respect to high frequencies at or above 800 MHz, thereby to provide maximized noise elimination effects.

These and other objects, features and advantages of the invention will be apparent from the following more particular description of preferred embodiments of the invention, as illustrated in the accompanying drawings.

DETAILED DESCRIPTION OF THE INVENTION

Figure 1:
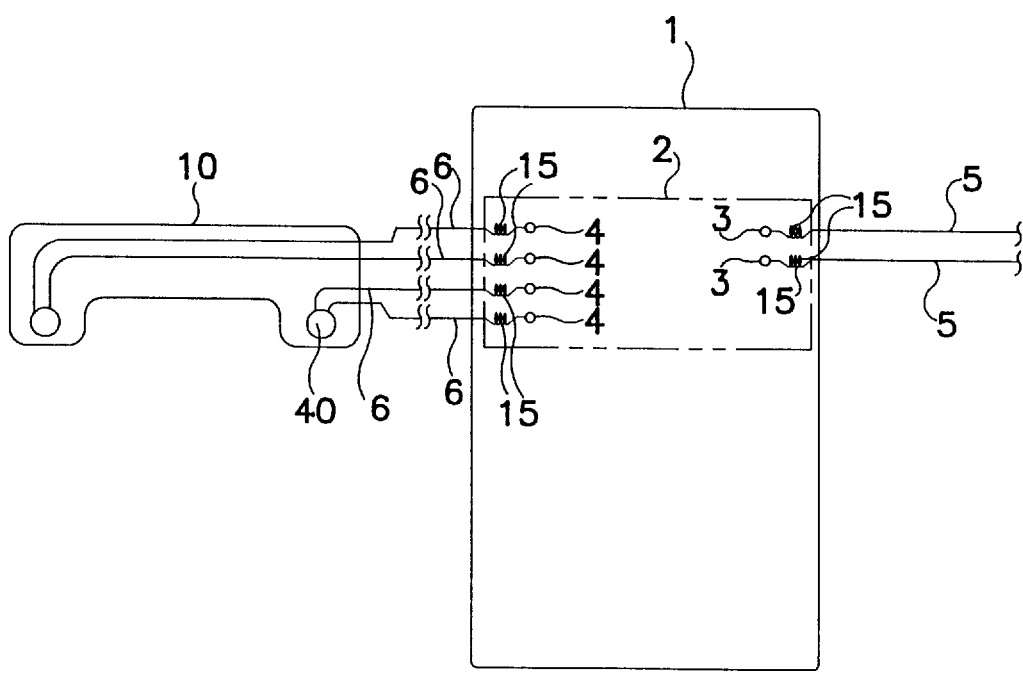
FIG. 1 is a schematic circuit diagram of a telephone employing the noise elimination device in accordance with one preferred embodiment of the invention.

Referring to FIG. 1, a prior established stationary telephone is shown, which has a main body 1. Provided in this main body 1 is a printed circuit board 2 that supports thereon necessary electronic parts or components with electrical interconnections thereamong in a known manner. A telephone handset 10 is operatively coupled to the main body 1. The circuit board 2 is electrically connected at terminals 3 to associated external communication lines 5, and is also connected at terminals 4 to signal transmission lines 6 of the handset 10.

As shown, a plurality of choke coils 15 are arranged on the circuit board 2 in such a manner that they are inserted between each external lines 5 and its corresponding terminals 3, and further between each signal line 6 and its corresponding terminal 4 associated therewith.

Figure 2:
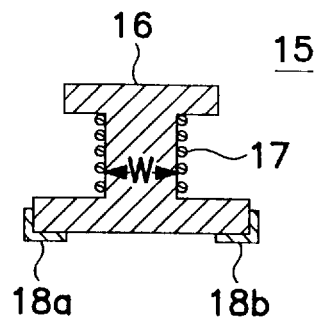
FIGS. 2 through 5 illustrate in cross-section choke coils each used as the noise elimination device.

As shown in FIG. 2, the individual choke coils 15 consists of a core 16 with a wire 17 formed or wrapped around it. The core 16 may be made of alumina, which has a profile of an integral combination of a letter "T" and a bottom bar (−). The wire 17 is turned around the base of the T-shaped portion of core 16 to provide a single-layered winding configuration with adjacent ones of wrapped winding portions spaced apart from each other at a limited interval defining a narrow gap therebetween as shown. The wrapped wire 17 has one terminate end electrically connected to a first electrode 18a disposed at one corner edge of the bottom "bar" portion of core 16, and another terminate end connected to a second electrode 18b at the opposite corner edge thereof.

The choke coil 15 of FIG. 2 has the single-layered winding 16 with a gap defined between adjacent winding portions (herein referred to as a "space-wrapped" winding configuration) thereby decreasing any possible stray capacitance inherently present at adjacent wire portions-called the "line-to-line" stray capacitance. In addition, the core 16 is comprised of alumina of low dielectric constant K, which may be 10 or below with the result of the stray capacitance between the electrodes 18a, 18b being decreased to 0.3 pF or less. This may serve to eliminate high-frequency noises transmitted over-the-air from outside radiotelephone transceivers and then applied to the telephone main body 1 by way of the external lines 5 and/or signal lines 6. Ideally, the stray capacitance between electrodes 18a, 18b is zero; practically, however, the capacitance may fall within a range of from 0.1 to 0.2 pF due to difficulty in achieving such an ideal state when reduced to practice.

Figure 3:
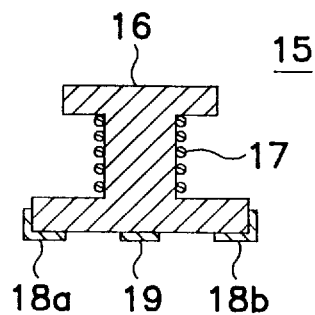

Note that the reduction or suppression of stray capacitance may be attained by employing any one of the single-wrapping or space-wrapping of the wire 17 around the core 16. In addition to this, the stray capacitance between spaced-apart electrodes 18a, 18b may alternatively be decreased by increasing the distance therebetween to be as wide as possible. Also, the stray capacitance may be further decreased by use of a ground-coupled electrode 19 that is additionally arranged on the bottom surface of the core 16 at a midway position between the electrodes 18a, 18b on the bottom bar, as shown in FIG. 3.

Note also that the reduction of stray capacitance may still alternatively attained by employing another approach: in the case where the core 16 is replaced with a resin-made bobbin around which the wire 17 is to be wrapped, this bobbin may be comprised of a chosen low dielectric-constant material, such as epoxy-resin material or the equivalents thereof. Additionally, excluding of the use of any wire sheath may be preferable for reduction of stray capacitance due to the fact that coating of the wire 17 by a resin sheath leads to an increase in the line-to-line capacitance.

Figure 4:
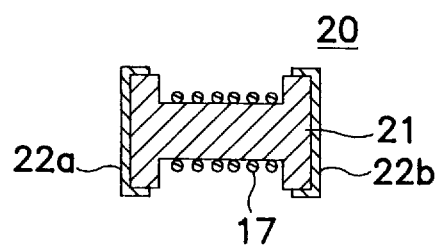
Figure 5:
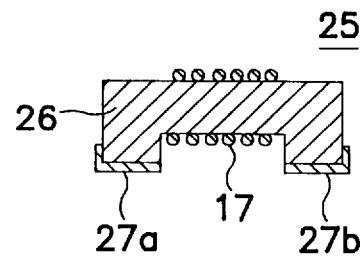

Other possible choke coils 20, 25 are shown in FIGS. 4 and 5, wherein these coils are of assembled with a horizontal orientation. More specifically, the choke coil 20 of FIG. 4 has an alumina core 21 of an "H"-shaped profile, having an intermediate bar portion around which the wire 17 is formed to provide the single-layered space-wrapped winding configuration as shown. The wiring 17 has one end connected to a first electrode 22a disposed on one side wall of the H-shaped core 21, and the other end connected to a second electrode 22b on the opposite side wall of the H-shaped core 21.

The choke coil 25 of FIG. 5 is similar to that shown in FIG. 4 with the H-like core 21 being replaced by an alumina core 26 having and up-side-down U-shaped profile having a top bar portion around which the wire 17 is wrapped, and the electrodes 22a, 22b of the embodiment of FIG. 4 being replaced by corresponding electrodes 27a, 27b which are disposed on the bottom surfaces of the up-side-down U-shaped core 26. The wrapped winding 17 has one end coupled to the first electrode 27a, and the other end to the second electrode 27b.

A respective one of the choke coils 15, 20, 25 shown in FIGS. 3, 4 and 5 may be placed at a connection node(s) between the telephone exchange module and its associated external communications lines, or at a node(s) between this exchange module and the telephone main body 1 shown in FIG. 1.

Generally, it is a microphone embedded in the telephone handset 10 of cord-linked telephones that will most significantly be affected by the application or "invasion" of high frequency noises as over-the-air transmitted from outside radiotelephone transceivers. By taking account of this fact, it may be preferable that respective high frequency elimination coils 15, 20, 25 are applied at an output section 40 of the telephone handset 10 as shown in FIG. 1, maximizing noise elimination effects. Note here that the resonant frequency of such coils is equal to, or substantially equivalent to, the use frequency of available handheld radiotelephone transceivers, which may be 800 to 900 MHz, 1,400 to 1,500 MHz, or 1,900 to 2,000 MHz, for example.

Figure 6A:
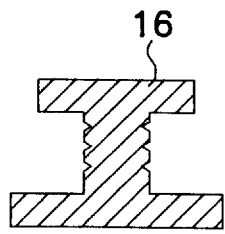
FIGS. 6A to 6C are cross-sectional views of modifications of the choke coils shown in FIGS. 3 to 5.
Figure 6B:
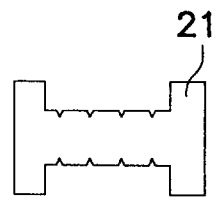
Figure 6C:
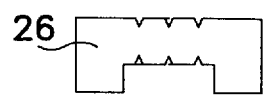

Some possible modifications of the high-frequency noise elimination coils are shown in FIGS. 6A to 6C, wherein each coil comes with a bobbin or core having a plurality of spiral turns of groove formed in the surface for position determination of the wire 17 to be space-wrapped therearound as discussed previously. With such an arrangement, the presence of such groove may facilitate accurate alignment in position of the wire 17 on the surface of the bobbin or core, thus successfully preventing any positional deviations from taking place along the surface. Consequently, it becomes possible to suppress or eliminate the occurrence of any variations in stray capacitance between adjacent wrapped wire portions, which may in turn prohibit undesired variations in the resonant frequency. This may cause the noise elimination effects to remain stable among a variety of devices manufactured, with enhanced reliability.

Figure 7:
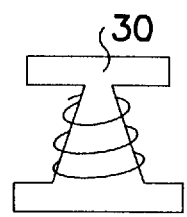
FIG. 7 is a front view of a noise elimination coil in accordance with a further embodiment of the invention.

Another modification of the noise elimination coil is shown in FIG. 7, wherein a bobbin or core 30 has a frusto-conic or tapering wire-wrapping portion, with a profile being gradually varied in diameter or thickness from one end to the other. With such an arrangement also, the resulting wrapped winding configuration can be prevented from deviating in position therearound at least in a direction toward the end with a greater diameter, preventing the line-to-line stray capacitance from varying. Furthermore, as compared to the embodiments of FIGS. 6A to 6C employing the wire-position defining groove, the tapered core 30 can be reduced in complexity of shape, causing the manufacturing cost to decrease accordingly while retaining the ease-to-wrapping feature.

In any one of the illustrative embodiments shown in FIGS. 2 to 5, it is preferable that the width W of the single-layered winding configuration formed around the core or bobbin be specifically determined to fall within a range as defined by $$D \times N \leq W < D \times (N+1),$$

where D is the diameter of the wire 17 and N is the number of turns of wire 17. With this setting, it is possible for the single-layered/gap-controlled alignment winding structure to secure each turn of the winding in position and, simultaneously, to suppress the occurrence of variations in inductance and/or stray capacitance. It is also possible to eliminate any future movements of once-wrapped winding after the noise elimination device is assembled in a target equipment, thus letting the resultant characteristics become more stable. Furthermore, employment of the setting makes it possible for factory workers to readily discover any possible differences between assemblies under manufacture in wire-wrapping number, or to discover the presence of irregular wrapped state if any.

Figure 8:
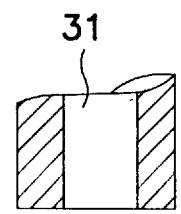
FIG. 8 shows a noise elimination coil in accordance with a still further embodiment of the invention.

A further modification of the noise elimination coil of FIG. 5 is shown in FIG. 8. The coil shown employs a resin coating layer 32 covering the entire surface of a wrapped wire. This is for facilitating reliable pick-up operations of the coil by a vacuum chuck 31 of a mounting machine for mounting the coil on the target printed circuit board being manufactured, while preventing the winding from shifting or moving along the core surface.

Also, the coil of FIG. 8 has a pair of external contact electrodes 33 on the opposite side wall surfaces, which do not have any portions extending onto the bottom surfaces of the core, enabling a further decrease in stray capacitance.

In the above embodiments or modifications, the winding is constituted from a wire consisting of a conductor and a coating layer or sheath for covering the coil, the coating being made of a insulative material of low dielectric constant. The conductor may be copper, whereas the sheath may be polyimide, polyurethane, or the like.

In the above embodiments or modifications, the core has the height of 1.8 mm, the length of 3.2 m, and the width of 1.6 mm, for example. The wire may be turned around the central portion of the core in a single-layered winding, one end thereof being connected to an electrode while the other end thereof being connected to the other electrode, respectively. In this case, the number of turns may be 12 and the diameter of the wire may be 35 μm, for example.

The present invention has been described by way of exemplary embodiments. Variations and modifications other than those disclosed will occur to skilled artisans without departing from the spirit and scope of the invention, which is defined in the claims appended hereto.

What is claimed is:

1. A cord-linked stationary telephone connected to an external communication line, said telephone being resistant to high frequency noises induced by radiotelephone transceivers, said telephone comprising:

a main body;

a circuit board contained within said main body, said circuit board electrically coupled to each of a plurality of conductors of said communication line; and a handset electrically coupled to said circuit board via a plurality of conductors;

wherein said circuit board comprises a plurality of high frequency noise elimination devices, each conductor of said communication line and said handset being connected to a respective one of said devices, each of said devices having a resonating frequency at or above 800 MHZ and comprising a high-frequency noise elimination coil having a stray capacitance between spaced-apart electrodes equal to or less than 0.3 pF.

2. The telephone of claim 1, wherein said coil has one of a core and a bobbin being made of a material having a dielectric constant K of 10 or less, and a winding wrapped around said one of said core and said bobbin.

3. The telephone of claim 2, wherein said winding wrapped around said one of said core and said bobbin has at its winding portion a width W as defined by $$D \times N \leq W < D \times (N+1),$$

where D is a diameter of said winding, and N is a number of turns thereof.

4. The telephone of claim 1, wherein said coil is at a position corresponding to an output to a microphone in said handset.

5. The telephone of claim 1, wherein said coil has a resonant frequency substantially equivalent to a use frequency of handheld radiotelephone transceivers.

6. The telephone of claim 1, wherein said coil has a single-layered wound wire structure.

7. The telephone of claim 1, wherein said coil has a winding, wires of which define a gap between each adjacent turn of the winding.

8. The telephone of claim 1, wherein said coil excludes any external resin sheath material.

* * * * *